United States Patent [19]

Henthorn

[11] 4,372,229
[45] Feb. 8, 1983

[54] RUNNER PLANTER MEANS

[76] Inventor: Marcus D. Henthorn, Rte. 1, Roachdale, Ind. 46172

[21] Appl. No.: 237,633

[22] Filed: Feb. 24, 1981

Related U.S. Application Data

[63] Continuation-in-part of Ser. No. 123,300, Feb. 21, 1980, abandoned.

[51] Int. Cl.³ .............................................. A01C 5/00
[52] U.S. Cl. ..................................................... 111/86
[58] Field of Search ................... 111/86, 85, 7, 10–14, 111/16, 52, 80, 15

[56] References Cited

U.S. PATENT DOCUMENTS

| | | | |
|---|---|---|---|
| 221,004 | 10/1879 | Strayer | 111/85 |
| 232,762 | 9/1880 | Rogers | 111/85 |
| 452,245 | 5/1891 | Szarkowski | 111/86 |
| 2,545,747 | 3/1951 | Oswald et al. | 111/85 |
| 2,768,591 | 10/1956 | James | 111/7 |
| 2,834,446 | 5/1958 | Wade | 111/86 X |

FOREIGN PATENT DOCUMENTS 651745  3/1979  U.S.S.R. ................... 111/7

Primary Examiner—James R. Feyrer

[57] ABSTRACT

The side walls at the rear end of the seed-planter runner are substantially spread apart, and a diverter means distributes the seed laterally to achieve a substantially spread seed-planting pattern and thus more seed per lineal distance of the seed-planting effort.

Runner-planter type of seed planters, such as for commercial planting of rows of beans, are known agricultural implements. The planters, often called runners or shoes, are mounted in a gang or group, several abreast, for being pulled or dragged by an associated vehicle; and as they are pulled forwardly, the front part of the planter shoes divides the earth to leave a narrow furrow, and the rear portion of the shoes provides a place at which the beans or other seed particles are fed into the furrow from a seed hopper carried by the vehicle.

It is to such type of seed planters that the present invention relates.

1 Claim, 11 Drawing Figures

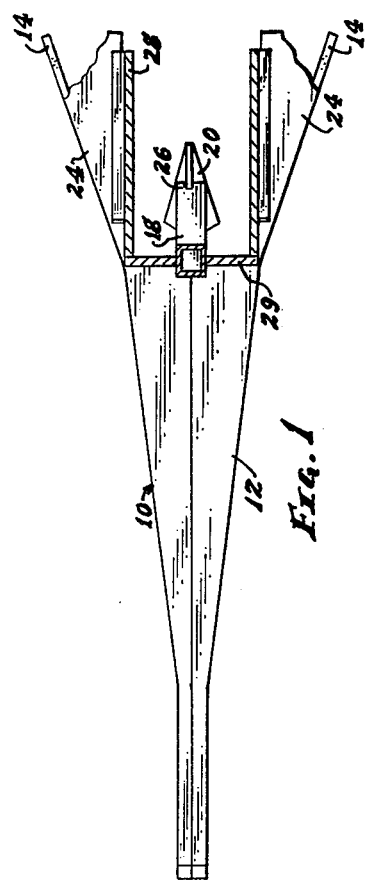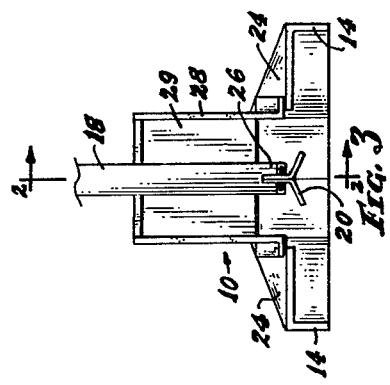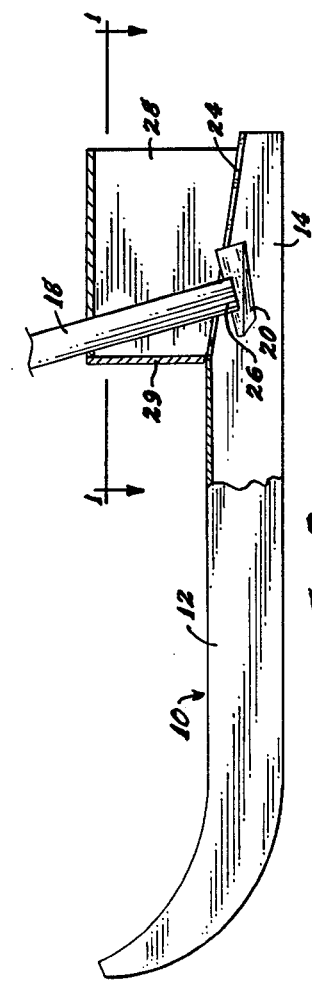

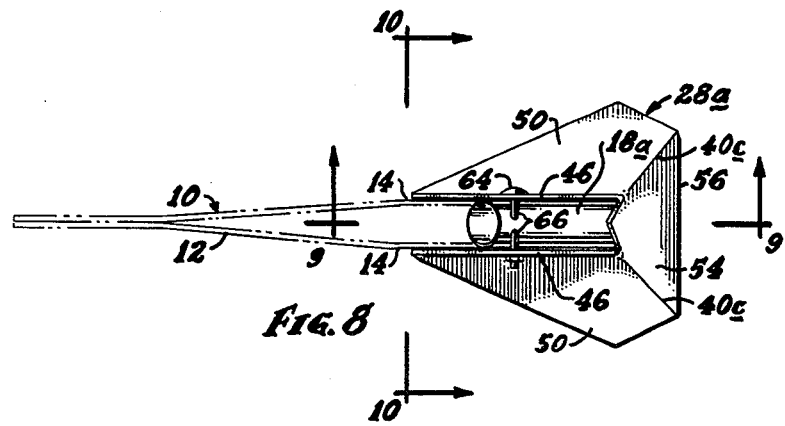
F1G. 8
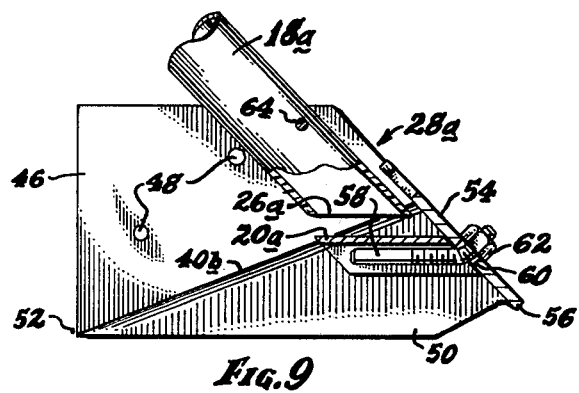
F1G. 9
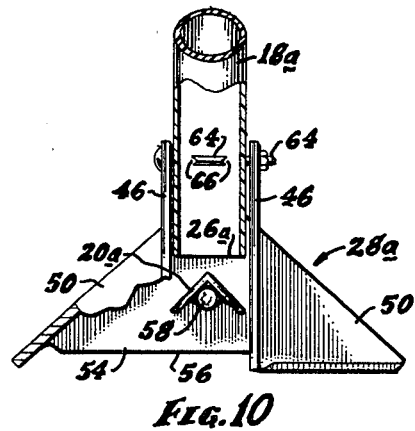
F1G. 10

RUNNER PLANTER MEANS

This is a Continuation-in-Part of co-pending U.S. patent application of the same applicant, Ser. No. 123,300, filed Feb. 21, 1980, now abandoned, entitled "Runner Planter Means."

The present invention relates to seed-planting equipment of runner planter type.

Concepts of the invention provide the better production by the double advantages of more seed-plantings per linear foot of the planting operation, and more sturdiness of the individual plants by the mutually-advantageous bracing effect of the greater quantity and laterally-spaced nature of the growing plants which result from the advantageous seed-planting achieved by the invention.

Further, the concepts provide an advantageous seed planting means which can be provided as original equipment or as a modification accessory to existing equipment.

The present invention concepts also provide new and advantageous concepts for the provision of a multiple-function hood member for the planter runner, and an advantageous manner of forming the hood member.

According to concepts of the present invention, the rear portion of the vertical side walls, which provide the rear portion of a seed-planter runner or shoe, are caused to be substantially spread, and a seed-diverter is provided for the seed-delivery chute. These concepts co-operate to provide that the seed distribution is not the substantially linear row resulting from conventional planters, but instead is a substantially wider swath of seeds, and providing the advantageous crop-production thereby resulting.

Particular benefit is achieved in using this invention in the planting of beans, although other crop-production may advantageously use the equipment.

The components may be provided on Massey Ferguson planters; but all planters of runner type may advantageously be provided with the swath-achieving seed-planting components of the inventive concepts.

Further, there is provided a multiple-function hood member for the planter runner, and an advantageous manner of forming the hood member. The hood member provides the multiple functions of shielding the outlet seed-discharge chute, supporting a seed diverter component, serving as a spreader of the furrow side walls, and serving also as a shield which prevents the upturned soil or earth from falling back into the swath or furrow until the seeds have fallen thereinto in the laterally-spread manner which achieves the advantageous relatively wide seed-swath.

The rows planted by this improved planter can be cultivated like other row-planted crops, keeping out the weeds, and also mulching of the ground.

The above description is generally of an introductory nature. More particular details, features, and concepts are set forth more fully in the following more-detailed description of embodiment illustrative of the inventive concepts, taken in conjunction with the accompanying somewhat schematic drawings, in which:

FIG. 1 is a top or plan view of a planter shoe embodying the inventive concepts, but with a portion broken away, as shown by Section-line-1—1 of FIG. 2, to illustrate details otherwise hidden;

FIG. 2 is a side elevation view of the planter shoe of FIG. 1, but with a portion broken away, as shown by Section-line 2—2 of FIG. 3, to illustrate details otherwise hidden;

FIG. 3 is a rear elevational view of the planter shoe shown in FIGS. 1 and 2;

FIG. 8 is a plan view of a plural-function hood member as positioned when connected to the rear of a planter runner or shoe;

FIG. 9 is a vertical, longitudinal cross-sectional view of the hood member, as taken generally along Section-line 9—9 of FIG. 8, but in slightly enlarged scale, and illustrating a seed-deflector member;

FIG. 10 is a vertical, transverse cross-sectional view of the hood member, as taken generally along Section-line 10—10 of FIG. 8, also in somewhat enlarged scale, and also showing the seed-diverter in end view.

Figure 4:
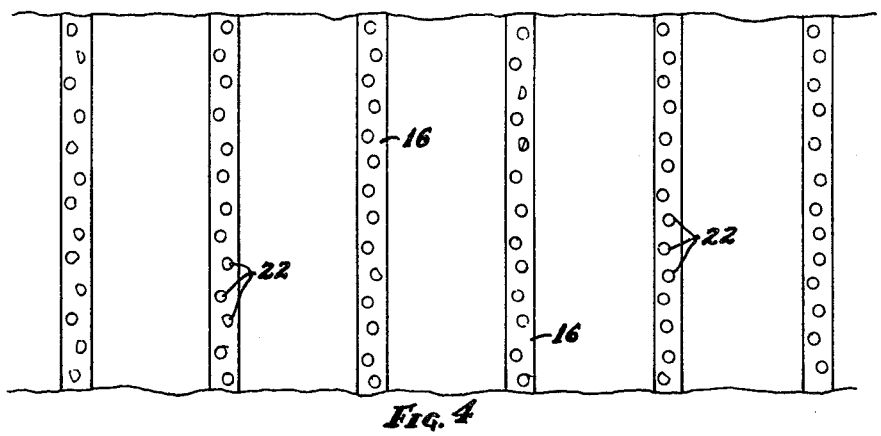
FIG. 4 is a top view of an agricultural tract which has been seeded with conventional shoe-type runners or planter.

As shown in the drawings, the invention relates to a runner type planter means; and equipment of this type has a plurality of planter runners or shoes 10, carried in a side-by-side gang and drawn by a tractor. Each of the planter runners or shoes 10 has a forwardly-located earth-parting component 12; and rearwardly thereof the shoe 10 has vertical side walls 14 which, as the runner is pulled forwardly along the ground, provide an earth-shielded furrow 16 into which seed is to be planted. Carried above but adjacent the shoe 10 is a seed hopper (not shown) from which extends a seed-delivery chute 18 which delivers seed behind the forwardly-located earth-shielding component 12 and between the rearwardly-located vertical side walls 14.

As so far described in this numerical description, no invention is here asserted, these components 10 through 18 merely describing existing equipment and as background for the improvement achieved by the inventive concepts.

The present invention comprises the concept of spreading the vertical side walls 14 adjacent the rear of the shoe runners 10 so as to achieve a substantially wider earth-shielded swath of the seed furrow 16, and the provision of a seed diverter means 20 which is operative to distribute portions of the seed 22 across the width of the furrow and laterally of other portions of the seed.

Figure 5:
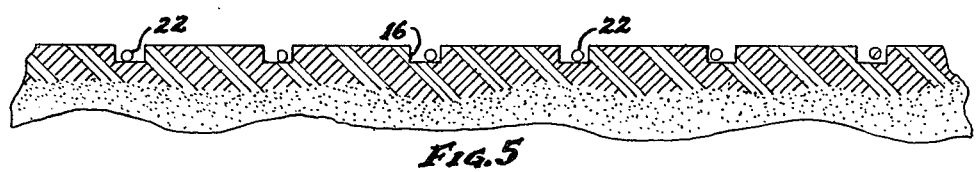
FIG. 5 is a vertical cross-sectional view of the agricultural tract shown in FIG. 4.
Figure 6:
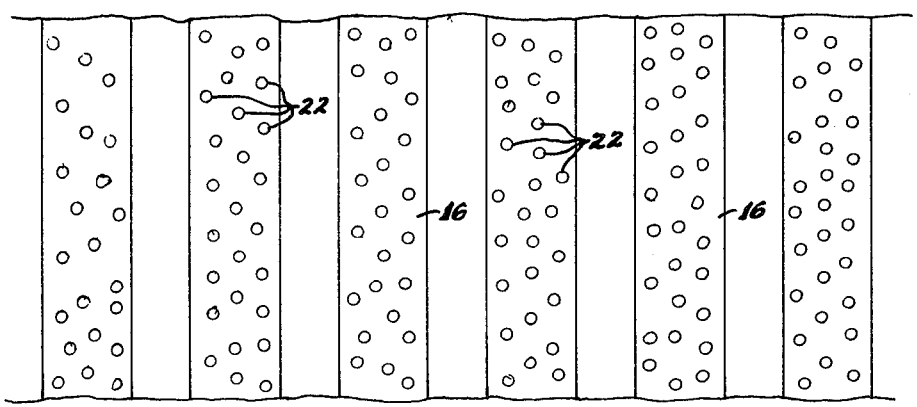
FIG. 6 is a top view of an agricultural tract which has been seeded by shoe-type runners or planters embodying the present invention.
Figure 7:
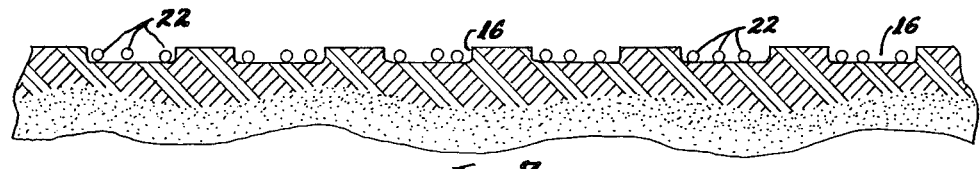
FIG. 7 is a vertical cross-sectional view of the tract shown in FIG. 6, seeded by equipment of the present invention.

This advantageous result is indicated schematically by noting the differences between FIGS. 4 and 5, which diagrammatically illustrate the furrows 16 cut by conventional planter runners or shoes, and which are relatively narrow furrows 16 with most of the seed 22 in single-seed rows, and, by contrast, noting FIGS. 6 and 7, which diagrammatically illustrate relatively wider furrows 16 cut by modified planter runners or shoes 10 of the present invention, and with a seed diverter 20 of the present invention, by which the seed 22 is caused to be planted in a substantially wider swath.

This achievement of a significantly wider swath of planted seed 22 provides better yield, that is, significantly more plants per lineal distance of the seed-planting effort, thus more plants per cultivated acre.

Further, the invention provides that the upper portion of the rearward portion of each of the vertical side walls is formed to provide an overlying earth-shielding cover panel 24 in the region of the delivery of seed, that is, adjacent the outlet 26 of seed-chute 18 and the seed diverter 20.

Advantageously, as shown, also there is provided an earth-shielding cover or hood member 28 inwardly of the vertical side walls 14, and also in the region adjacent the outlet 26 of the seed-chute 18 and the seed diverter 20, but inwardly of the cover panels 24. This hood means 28 provides a shielding of the seed-planting furrow 16 from earth filling back therein prior to the planting distribution of the seeds. The hood 28 has a front vertical wall 29.

As shown, the seed diverter means comprises a deflector 20 carried by the seed-delivery chute 18 adjacent its outlet 26, and is operative to baffle the seed laterally to achieve the wider planting swath provided by the wider furrows achieved by the invention.

The overlying earth-shielding cover panels 24 are shown formed by integrally forming over the upper rear portion of the vertical side walls 14, forming generally horizontal triangular ears which shield the furrow 16 from earth filling in prior to the planting of the individual seeds.

An alternative embodiment is illustrated in FIGS. 8-10. As there shown, there is provided an advantageous embodiment whose general similarity to the first embodiment is not only probably quite apparent at first glance from the drawings, but which similarity is made more clear by the use of reference numbers, as to its various components, which differ from corresponding ones of the first embodiment only by having a suffix "a" added.

More particularly, noting FIG. 8, the multi-purpose hood member 28a is shown as formed (FIG. 11) from a single unit 32 of heavy plate material or stock, and symmetrically along its central longitudinal axis 34, being bent along bend lines 40 (as permitted by slits 42 and fold-end holes 44) to provide several panel portions described below.

The panel portions of the hood 28a include parallel side panels 46, which are connectable by bolts (not shown) through openings 48 to the vertical side walls 14 of the planter runner or shoe 10, thus connecting the hood 28a to the shoe 10.

Also, the hood 28a has diverging panels 50 which generally correspond to panels 24 of the first embodiment, and which each diverge in a sloping manner outwardly and downwardly from the respective one of the side walls 46, and more particularly from a bend line 40b extending diagonally upwardly and rearwardly from a lower and forward end 52 of the respective side panel 46.

The diverging panels 50 provide a cutting and a raising of the soil or earth along the side walls of the swath or furrow 16 being planted, permitting the seed 22 to be planted in the swath 16, prior to the earth or soil falling into the furrow.

The hood 28a also has a multi-function rearward and sloping panel 54, shown of a generally triangular shape, extending at the rear of the hood 28a between the bend lines 40c at the rear of the diverging panels 50.

The rear panel 54 has its lower edge 56 above the lowermost forward portion 52 of the diverging panels 50, shown here as by that rear edge 56 of rear panel 54 being provided to be about ¾ inch above the forward portion 52.

This relatively higher height may be achieved by the form of the hood 28a or by the angle of the bolt-holes 48 with respect to mating bolt-holes (not shown) in the shoe runner 10; and the achievement of this upward spacing of the rear lower edge 56 is that it provides that the enclosure hood 28a does not disturb seed particles 22 which have been deposited in the furrow 16.

Further, the deflector 20a is advantageously shown as carried by the rear hood-panel 54. The deflector itself is shown as of inverted V-shape, here shown as angle iron; and a connector bolt 58 is shown welded thereto, it being shown as extendingly longitudinally and under the webs of deflector 20a. The deflector connector bolt 58 is shown as supported by passing through an opening 60 in the rear panel 54, and it is shown as secured thereto by a nut 62.

Rigidity of the assembly is aided by providing another connector bolt 64, this one extending transversely through the hood member's side panels 46 and passing through aligned openings 66 in the discharge chute 18a adjacent although somewhat above its end or outlet 26a, that seed outlet 26a being located above and generally directly over the deflector 20a.

Figure 11:
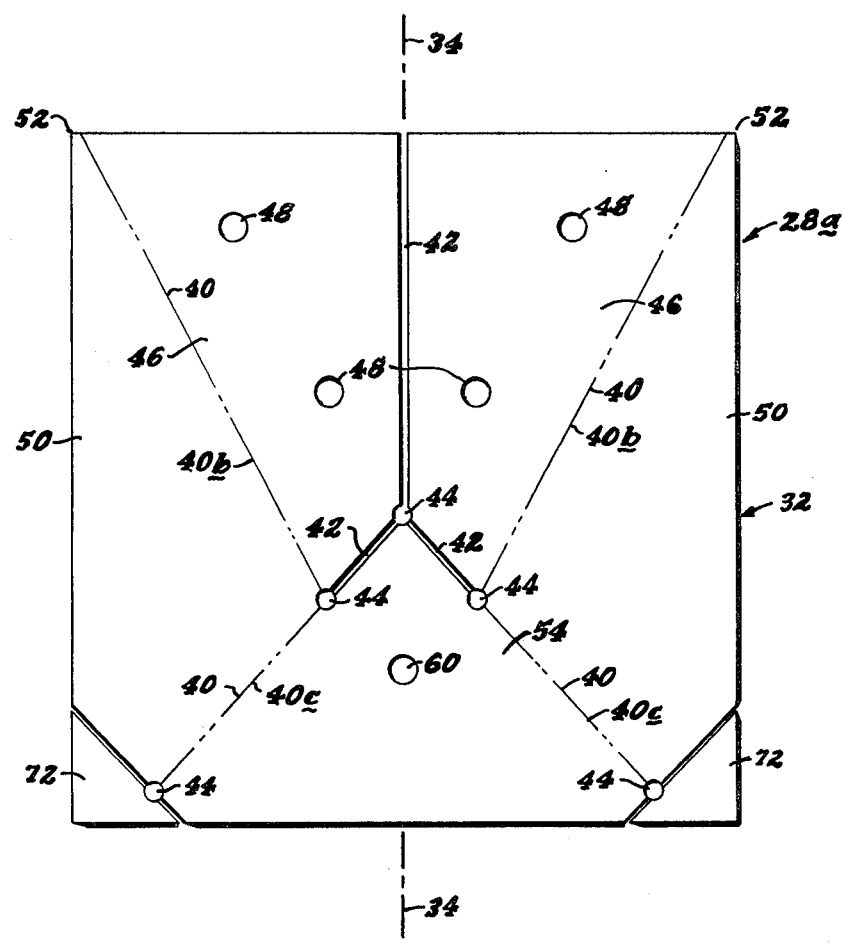
FIG. 11 is a plan view of a flat plate member by which the hood member may be advantageously formed, in a scale somewhat enlarged over that used in any of FIGS. 8-10.

FIG. 11 illustrates the advantageous concept of forming the hood 28a from a single piece of flat plate-like metal stock 32. It is shown provided with the five holes 44 plus the four connector holes 48, and the deflector-mounting hole 60. The holes 44 provide some manufacturing ease in the bending and in the cutting of the slits 42.

In the forming of the sheet 70 into the hood 28a, the corners 72 are severed from the rest of the sheet 32, the "Y"-shaped slits 42 provided, and the sheet 32 is then bent along the bend lines 40, that is the bend lines 40b and 40c, providing the hood member 28a as set forth herein.

The improvement of production by a planting effort utilizing the present inventive concepts, achieving more yield and providing better plant sturdiness by the advantageous bracing achieved by the more plants, is perhaps easily seen by the numerical comparison of furrow-widths. That is, conventional planters of beans achieve furrow and a row-width of no more than about an inch or so (for although the side walls are spaced wider than that, the earth fills the furrow and the bean seeds are not laterally dispersed); and, in contrast, the present invention provides a planted row at least five or more inches wide.

Moreover, the farm equipment can usually accommodate only a certain number of planter shoes in its gang, and thus the substantially higher number of plantings per lineal foot of tractor travel cannot be achieved merely by adding planter shoes to the gang. In contrast to that sort of thing, the substantially larger number of plantings per lineal foot is achieved with no addition of the number of planter shoes, but merely by the advantageous improvement of modifying each shoe and baffling the seeds laterally.

It is thus seen that a seed-planter runner according to the inventive concepts provides a desired and advantageous device, yielding the advantageous wider swath of furrow and of the distribution of beans or other seed being planted, achieving both higher yield per acre and sturdier plant growth as described herein.

Accordingly, it will thus be seen from the foregoing description of the invention according to these illustrative embodiments, considered with the accompanying drawings, that the present invention provides new and useful concepts of a seed-planter or shoe which may be formed as a modification of present equipment or as provided in new equipment, the inventive concepts herein set forth yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or precise form or arrangement of parts herein described or shown.

What is claimed is:

1. A planter runner assembly adapted to be attached to a planter, comprising a planter runner having a forwardly-located earth-parting component, and rearwardly thereof vertical side walls, which, when moved forwardly along the ground, provide between them a flat earth-shielded furrow into which seed is to be planted, and a seed diverter means which is operative to distribute seed across the width of said furrow, and a hood member formed to provide generally parallel side walls respectively attached to the vertical side walls of the planter runner, and earth-shielding walls extending transversely from the hood member's side walls, the said earth-shielding walls each diverging in a sloping manner outwardly and downwardly respectively from bottom edges of the hood member's side walls, and including a rearward cover means attached along the rear downwardly, rearwardly sloping edges of the said earth-shielding walls, said rearward cover means having a bottom transverse edge elevated above the lower edges of said earth-shielding walls and including means for mounting said seed diverter means, whereby the combination of the earth-shielding transversely-extending walls and the rearward cover means shield the seeds being planted from earth falling into the furrow, generated by the forward movement of the planter, until the distribution of the seeds as spread by the seed diverter means has taken place.

* * * * *